(12) United States Patent
Wang

(10) Patent No.: US 7,420,799 B2
(45) Date of Patent: Sep. 2, 2008

(54) CASE STRUCTURE OF PORTABLE ELECTRONIC DEVICE

(75) Inventor: Wen-Hung Wang, Taipei (TW)

(73) Assignee: Asustek Computer Inc., Taipei (TW)

( * ) Notice: Subject to any disclaimer, the term of this patent is extended or adjusted under 35 U.S.C. 154(b) by 204 days.

(21) Appl. No.: 11/393,117

(22) Filed: Mar. 30, 2006

(65) Prior Publication Data

US 2006/0279919 A1    Dec. 14, 2006

(30) Foreign Application Priority Data

Jun. 13, 2005    (TW) .............................. 94119524 A

(51) Int. Cl.
*G06F 1/16*    (2006.01)
(52) U.S. Cl. ...................... 361/681; 361/683; 292/102; 292/106
(58) Field of Classification Search ......... 361/679–683; 312/223.1, 223.2, 333
See application file for complete search history.

(56) References Cited

U.S. PATENT DOCUMENTS 6,659,516 B2 * 12/2003 Wang et al. .............. 292/251.5
6,762,928 B2 * 7/2004 Lo .............................. 361/681
7,050,295 B2 * 5/2006 Kang .......................... 361/683
7,181,238 B2 * 2/2007 Chiang .................... 455/556.1
2006/0170223 A1 * 8/2006 Homer et al. ............... 292/102

* cited by examiner

*Primary Examiner*—Jayprakash N Gandhi
*Assistant Examiner*—Anthony Q Edwards
(74) *Attorney, Agent, or Firm*—Thomas, Kayden, Horstemeyer & Risley

(57) ABSTRACT

A case structure of an electronic device comprises a first shell, a second shell, a first engagement element, a second engagement element, a first spring element, a second spring element and a plug element. The first engagement element protrudes from the first shell. The second shell having a first penetrating opening allows the first engagement element to pass through. The second engagement element having a button portion passes through a second penetrating opening of the second shell. The second engagement element is driven by the button portion and the first spring element to control the second engagement element and the first engagement element to engage or disengage from each other. The plug element located in the second shell is pushed for filling in the first penetrating opening by the second spring element.

18 Claims, 4 Drawing Sheets

CASE STRUCTURE OF PORTABLE ELECTRONIC DEVICE

RELATED APPLICATIONS

The present application is based on, and claims priority from, Taiwan Application Serial Number 94119524, filed Jun. 13, 2005, the disclosure of which is hereby incorporated by reference herein in its entirety.

FIELD OF THE INVENTION

The present invention relates to an electronic product, and more particularly, to a case structure of a portable electronic device.

BACKGROUND OF THE INVENTION

Smallness, portability, and convenience are the main trends in a portable electronic device design, such as electronic products like notebook computers, portable TVs, cell phones, or personal digital assistants (PDA).

FIG. 1 is a diagram illustrating a notebook computer in accordance with a prior art.

Traditionally, the case structure of a notebook computer, for example, the main parts of the notebook include a bottom case 102 which consists of the main frame of the notebook and a keyboard are sustained, and a cover case 104 with a display panel 101 that is associated in the bottom case 102. The bottom case 102 is pivoted on the cover case 104 by a hinge 103. The bottom case 102 and the cover case 104 must be opened apart from each other when the notebook is operated. When the notebook is idle, the bottom case 102 and the cover case 104 can be closed.

Generally, a latch structure is utilized to control the bottom case 102 and the cover case 104 to be opened or closed. The latch structure comprises a button portion 108 configured in the bottom case 102 and a latch 106 fixed on the cover case 104. When the bottom case 102 and the cover case 104 are closed, the latch 106 goes through a through-hole 110 located on the bottom case 102 to embed in the button portion 108, that makes the cover case 104 and the bottom case 102 engaged together.

When the latch 106 is released by pushing the button, the cover case 104 can be opened for operation. When the latch 106 is released, the cover case 104 is pushed by a spring element (not shown) settled in the hinge 103 that makes the bottom case 102 depart from the cover case 104 by disengaging the latch 106 from the through-hole 110. The cover case 104 then can be easily lifted to a suitable operation location.

However, the spring element of the hinge 103 sustaining the twist stress in operation is vulnerable to stress cracking, so that the hinge 103 must be operated under a restricted stress. Furthermore, the through-hole 110 located on the base case 102 can be plugged by debris such as dust, food or other undesirable materials when the latch 106 is disengaged. This debris can prevent the cover case 104 from engaging with the base case 102.

SUMMARY OF THE INVENTION

Therefore, it is desirable to provide a case structure of a portable electronic device that can solve the problems aforementioned.

In some embodiments of the present invention, the case structure comprises a first shell, a second shell, a first engagement element, a second engagement element, a first spring element, a second spring element and a plug element.

The first engagement element protrudes from the first shell for at least a certain distance. The second shell has a first penetrating opening and a second penetrating opening located on different sidewalls thereof respectively, wherein the first penetrating opening is perpendicular to the second penetrating opening. The first penetrating opening serves as a through-hole allowing the first engagement element passing through the second shell.

The second engagement element set in the second shell has a button portion and an embedding portion, wherein the button portion protrudes out of the second shell through the second penetrating opening. The embedding portion is used for engaging with the first engagement element. The button portion movably set in the second penetrating opening is used for driving the embedding portion to control the cooperation between the first engagement element and the second engagement element, wherein the moving direction of the embedding portion is perpendicular to the axis of the first penetrating opening.

The first spring element is located in the second shell. One end of the first spring element contacts a sidewall of the second shell, and the opposite end contacts the second engagement element. When the first spring element is compressed, the second engagement element can be pushed back to its native position.

The plug element set in the second shell has a plug portion conforming and aligning with the first penetrating opening.

The second spring element is also located in the second shell. One end of the second spring element contacts another sidewall of the second shell, and the opposite end contacts the plug element. When the second spring element is compressed, the plug element can be pushed for driving the plug portion to fill into the first penetrating opening.

When the first shell and the second shell close up, the first engagement element goes through the first penetrating opening, pushing the plug portion originally filling the first penetrating opening into the second shell and compresses the second spring element. Then the first engagement element pushes the embedding portion to drive the second engagement element to move along the direction parallel to the axis of the second penetrating opening, and the first spring element is compressed by the second engagement element. Subsequently, the compressed first spring element drives the second engagement element back to its native position to make the embedding portion of the second engagement element engage with the first engagement element. When the button portion of the second engagement element is pushed to drive the embedding portion to release the first engagement element, the plug portion is driven by the compressed second spring element to make the plug portion fill into the first penetrating opening and push the first engagement element away from the first penetrating opening. When the first engagement element is released, the first spring element is compressed.

In accordance with the embodiments of the present invention, the plug portion driven by the second spring element is utilized for filling the through-hole (such as the first penetrating opening) set on the case structure of a portable electronic product (such as a notebook computer) to prevent debris filling therein, and pushing the cover case having a display panel (such as the first shell) to depart from the base case for a certain distance to allow an operator to lift the cover case easily.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The objective of the present invention is to provide a case structure for an electronic product. The aspects, objectives, features, and many of the attendant advantages of this invention will become more readily appreciated by reference to the following detailed description. The preferred embodiments are provided hereafter, and the portable electronic product may refer to a notebook computer.

Figure 1:
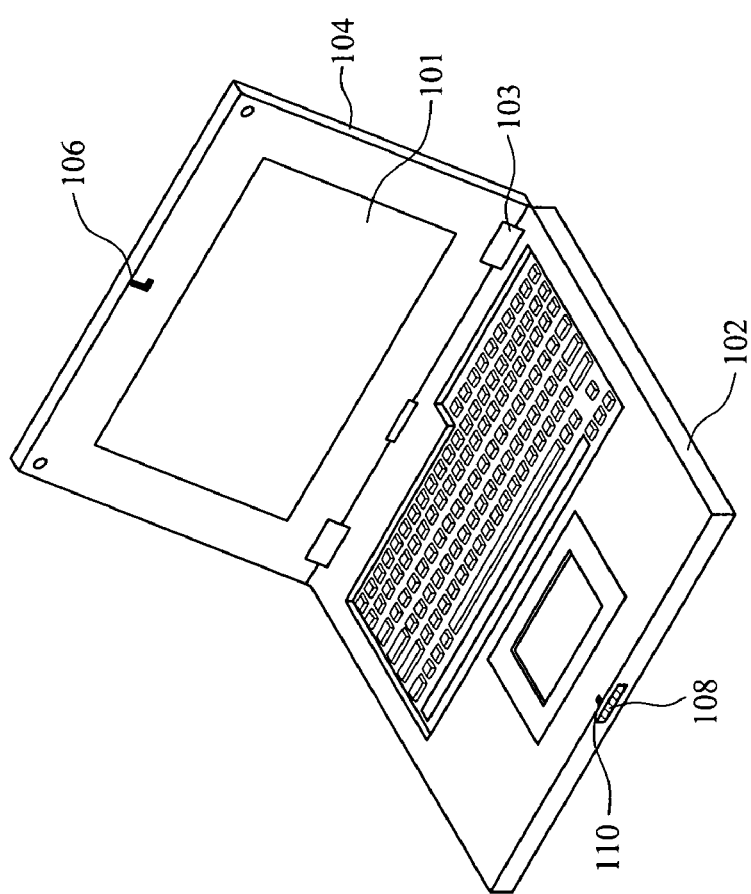
FIG. 1 is a diagram illustrating a notebook computer in accordance with a prior art.
Figure 2:
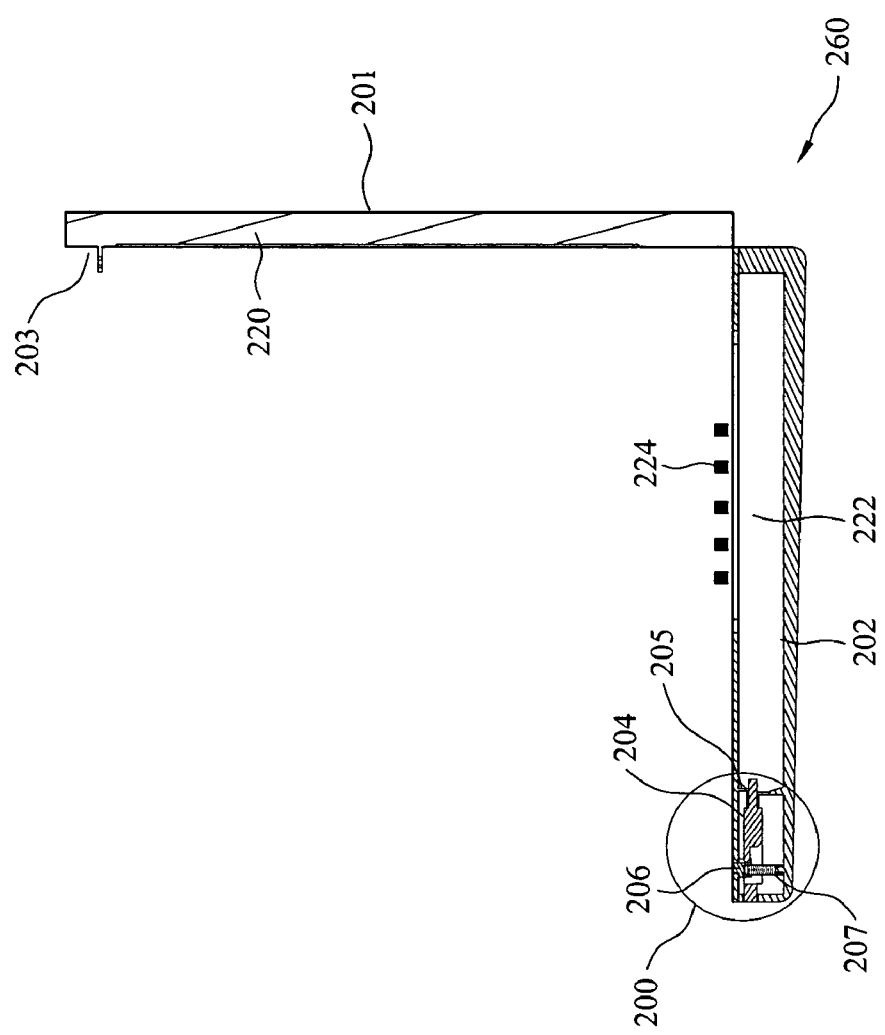
FIG. 2 illustrates a cross-sectional view of a notebook computer in accordance with a preferred embodiment of the present invention.

FIG. 2 illustrates a cross-sectional view of a notebook computer in accordance with a preferred embodiment of the present invention. In the preferred embodiment of the present invention, the notebook computer comprises a case structure 200, a display 220, a main frame 222 and a keyboard 224. The case structure 200 comprises a first shell 201, a second shell 202, a fist engagement element 203, a second engagement element 204, a first spring element 205, a plug element 206 and a second spring element 207. The display 220, the main frame 222 and the keyboard 224 are electrically connected to each other. The display 220 is settled in the first shell 201, and the main frame 222 and the keyboard 224 are settled in the second shell 202 by a plurality of means for fixing, such as screws, flanges or latches.

Figure 3:
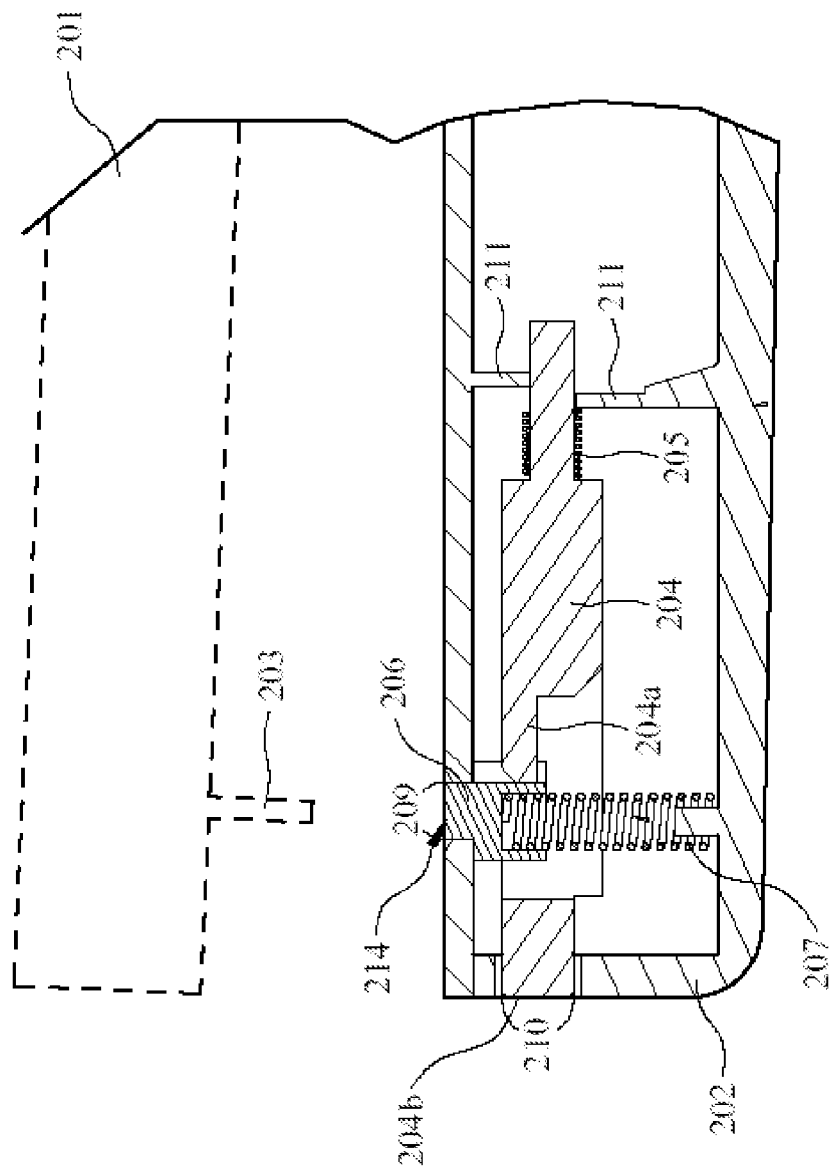
FIG. 3 is a magnified portion of a cross-sectional view illustrating the case structure of a notebook computer in accordance with FIG. 2.

FIG. 3 is a magnified portion of a cross-sectional view illustrating the case structure of a notebook computer in accordance with FIG. 2.

The first engagement element 203 protrudes from the first shell 201 for at least a certain distance. In the present embodiment, the first engagement element 203 is a latch protruding from the first shell 201 for 6 mm.

The second shell 202 has a first penetrating opening 209 and a second penetrating opening 210 located on different sidewalls thereof respectively, wherein the first penetrating opening 209 is perpendicular to the second penetrating opening 210. The first penetrating opening 209 serves as a through-hole allowing the first engagement element 203 to pass through the second shell 202.

The second engagement element 204 set in the second shell 202 has a button portion 204b and an embedding portion 204a, wherein the embedding portion 204a is a flange of the second engagement element 204, and the button portion 204b protrudes out of the second shell 202 through the second penetrating opening 210. The embedding portion 204a is used for engaging with the first engagement element 203. The button portion 204b movably set in the second penetrating opening 210 is used for driving the embedding portion 204a to control the cooperation between the first engagement element 203 and the second engagement element 204, wherein the moving direction of the embedding portion 204a is perpendicular to the axis of the first penetrating opening 209, and the moving direction of the button portion 204b is parallel to the axis of the second penetrating opening 210.

The first spring element 205 is located in the second shell. In the present embodiment, the first spring element 205 is a spiral spring, and the axis of the spiral spring is aligned to the second penetrating opening 210. One end of the first spring element 205 is fixed on a flange 211 of a sidewall of the second shell 202, and the opposite end is fixed on the second engagement element 204. When the first spring element 205 is compressed, the second engagement element 204 can be pushed along the axis of the second penetrating opening 210 to make the button portion 204b revert back to its native position where the second engagement element 204 and the first engagement 203 are engaged to each other.

The plug element 206 set in the second shell 202 has a plug portion 214 conforming and aligning with the first penetrating opening 209.

The second spring element 207 is also located in the second shell 202. In the present embodiment, the second spring element 207 is a spiral spring, and the axis of the spiral spring is parallel to the axis of the first penetrating opening 209. One end of the second spring element 207 contacts another sidewall of the second shell 202, and the opposite end contacts the plug element 206. When the second spring element 207 is compressed, the plug element 206 can be pushed to drive the plug portion 214 to fill into the first penetrating opening 209.

When the first shell 201 and the second shell 202 close up, the first engagement element 203 goes through the first penetrating opening 209, pushing the plug portion 214 originally filling the first penetrating opening 209 into the second shell 202 and compressing the second spring element 207. Then the first engagement element 203 pushes the embedding portion 204a to drive the second engagement element 204 to move along the direction parallel to the axis of the second penetrating opening 210, and the first spring element 205 is compressed by the second engagement element 204. Subsequently, the compressed first spring element 205 drives the second engagement element 204 back to its native position to make the embedding portion 204a engage with the first engagement element 203.

Figure 4:
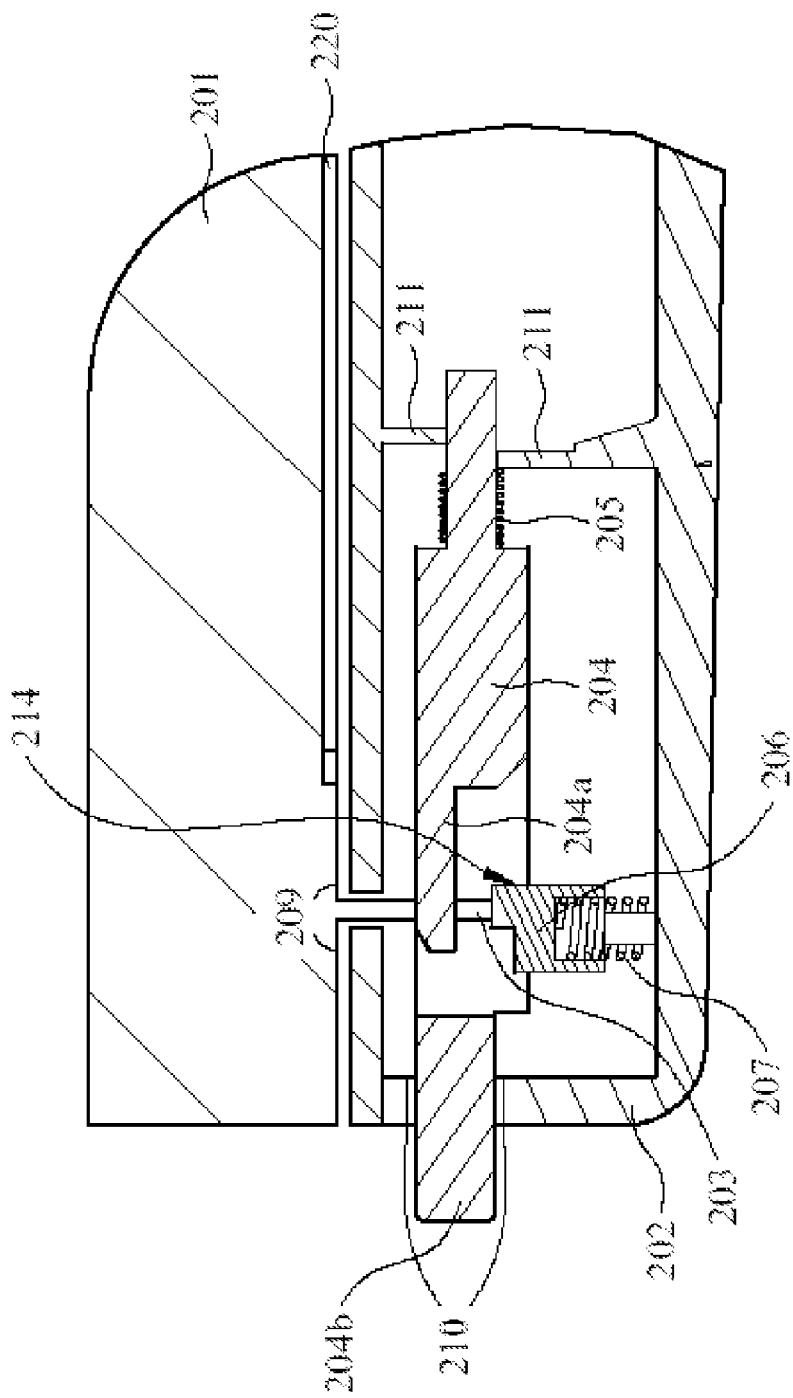
FIG. 4 is a cross-sectional view of the case structure illustrating the situation of the first shell and the second shell closed together, in accordance with FIG. 3.

FIG. 4 is a cross-sectional view of the case structure illustrating the situation of the first shell and the second shell closed together, in accordance with FIG. 3.

In the structure shown in FIG. 4, the button portion 204b of the second engagement element 204 protrudes into the second penetrating opening 210.

When the button portion 204b of the second engagement 204 is pushed to drive the embedding portion 204a to release the first engagement element 203, the plug portion 214 is driven by the compressed second spring element 207 to make the plug portion 214 fill into the first penetrating opening 209 and push the first engagement element 203 away from the first penetrating opening 209. The plug portion 214 filled into the first penetrating opening 209 has a surface conformed to the outer surface of the second shell 202, and the first shell 201 is pushed by the first engagement element 203 away from the second cell 202 for at least 6 mm shown as FIG. 3.

According to the preferred embodiments aforementioned, the feature and advantage of the present invention is to provide a case structure to prevent debris becoming plugged into the through-hole that normally allows an engaging device to go through it for closing a prior art notebook computer.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A case structure of a portable electronic device comprising:
   a first shell;
   a first engagement element protruding from the first shell;
   a second shell having a first penetrating opening and a second penetrating opening located on different sidewalls of the second shell respectively, wherein the first penetrating opening is perpendicular to the second penetrating opening, and the first penetrating opening allows the first engagement element to pass through the second shell;
   a second engagement element set in the second shell having a button portion and an embedding portion, wherein the embedding portion is used for engaging with the first engagement element, and the button portion movably set in the second penetrating opening for driving the embedding portion to move along a direction perpendicular to the axis of the first penetrating opening; a first spring element located in the second shell used to push the second engagement element back to its native position along the inverse direction, wherein one end of the first spring element contacts a first sidewall of the second shell, and the opposite end contacts the second engagement element;
   a plug element set in the second shell having a plug portion aligning with the first penetrating opening; and a second spring element located in the second shell used to push the plug element for driving the plug portion, one end of the second spring element contacting the sidewall of the second shell, and the opposite end contacting the plug element, wherein the button portion of the second engagement element is pushed to drive the embedding portion to release the first engagement element, the plug portion is driven by the second spring element to make the plug portion fill into the first penetrating opening and push the first engagement away from the first penetrating opening.

2. The case structure in accordance with claim 1, wherein the first engagement element protrudes from the first shell for 6 mm.

3. The case structure in accordance with claim 1, wherein the first shell has a display settled therein.

4. The case structure in accordance with claim 1, wherein the second shell has a main frame and a keyboard settled therein.

5. The case structure in accordance with claim 1, wherein the first engagement element is a latch protruding from the first shell.

6. The case structure in accordance with claim 1, wherein the embedding portion is a flange of the second engagement element used for engaging with the first engagement element.

7. The case structure in accordance with claim 1, wherein the moving direction of the button portion is parallel to the axis of the second penetrating opening.

8. The case structure in accordance with claim 1, wherein the second shell further comprises a flange used to fix the first spring element thereon.

9. The case structure in accordance with claim 1, wherein the first spring element is a spiral spring having an axis parallel to the axis of the second penetrating opening.

10. The case structure in accordance with claim 1, wherein the second spring element is a spiral spring having an axis parallel to the axis of the first penetrating opening.

11. A portable electronic device comprising: a case structure that comprises:
   a first shell;
   a first engagement element protruding from the first shell;
   a second shell having a first penetrating opening and a second penetrating opening located on different sidewalls of the second shell respectively, wherein the first penetrating opening is perpendicular to the second penetrating opening, and the first penetrating opening allows the first engagement element to pass through the second shell;
   a second engagement element set in the second shell having a button portion and an embedding portion, wherein the embedding portion is used for engaging with the first engagement element, and the button portion movably set in the second penetrating opening for driving the embedding portion to move along a direction perpendicular to the axis of the first penetrating opening;
   a first spring element located in the second shell used to push the second engagement element back to its native position along the inverse direction, wherein one end of the first spring element contacts a first sidewall of the second shell, and the opposite end contacts the second engagement element;
   a plug element set in second shell having a plug portion aligning with the first penetrating opening; and
   a second spring element located in the second shell used to push the plug element for driving the plug portion, one end of the second spring element contacting the sidewall of the second shell, and the opposite end contacting the plug element, wherein the button portion of the second engagement element is pushed to drive the embedding portion to release the first engagement element, the plug portion is driven by the second spring element to make the plug portion fill into the first penetrating opening and push the first engagement element away from the first penetrating opening;
   a display settled in the first shell;
   a main frame settled in the second shell electrically connected with the display; and
   a keyboard settled in the second shell electrically connected with the main frame.

12. The portable electronic device in accordance with claim 11, wherein the first engagement element protrudes from the first shell for 6 mm.

13. The portable electronic device in accordance with claim 11, wherein the first engagement element is a latch protruding from the first shell.

14. The portable electronic device in accordance with claim 11, wherein the embedding portion is a flange of the second engagement element used for engaging with the first engagement element.

15. The portable electronic device in accordance with claim 11, wherein the moving direction of the button portion is parallel to the axis of the second penetrating opening.

16. The portable electronic device in accordance with claim 11, wherein the second shell further comprises a flange used to fix the first spring element thereon.

17. The portable electronic device in accordance with claim 11, wherein the first spring element is a spiral spring having an axis parallel to the axis of the second penetrating opening.

18. The portable electronic device in accordance with claim 11, wherein the second spring element is a spiral spring having an axis parallel to the axis of the first penetrating opening.

* * * * *